(12) United States Patent
Suzuki

(10) Patent No.: US 8,001,832 B2
(45) Date of Patent: Aug. 23, 2011

(54) MISFIRE DETERMINATION DEVICE AND MISFIRE DETERMINATION METHOD FOR INTERNAL COMBUSTION ENGINE AND VEHICLE

(75) Inventor: Takashi Suzuki, Gotenba (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 311 days.

(21) Appl. No.: 12/373,994

(22) PCT Filed: Jun. 21, 2007

(86) PCT No.: PCT/JP2007/062489
§ 371 (c)(1),
(2), (4) Date: Jan. 15, 2009

(87) PCT Pub. No.: WO2008/026365
PCT Pub. Date: Mar. 6, 2008

(65) Prior Publication Data
US 2009/0308145 A1    Dec. 17, 2009

(30) Foreign Application Priority Data

Sep. 1, 2006 (JP) .................................. 2006-238282
Mar. 7, 2007 (JP) .................................. 2007-057466
May 25, 2007 (JP) .................................. 2007-138714

(51) Int. Cl.
*G01M 15/11* (2006.01)

(52) U.S. Cl. ........................................ 73/114.04
(58) Field of Classification Search ............. 73/114.02, 73/114.03, 114.04, 114.05, 114.07, 114.11
See application file for complete search history.

(56) References Cited

U.S. PATENT DOCUMENTS

| 7,707,874 | B2 * | 5/2010 | Suzuki | 73/114.04 |
| 7,712,356 | B2 * | 5/2010 | Suzuki | 73/114.04 |
| 2010/0218598 | A1 * | 9/2010 | Suzuki | 73/114.04 |

FOREIGN PATENT DOCUMENTS

| JP | 05-340294 A | 12/1993 |
| JP | 07-151009 | 6/1995 |
| JP | 07-151009 A | 6/1995 |
| JP | 10-231750 A | 9/1998 |
| JP | 11-507706 | 7/1999 |
| JP | 2001-065402 A | 3/2001 |
| JP | 2004-293350 A | 10/2004 |

* cited by examiner

*Primary Examiner* — Eric S McCall
(74) *Attorney, Agent, or Firm* — Kenyon & Kenyon LLP

(57) ABSTRACT

A damper post-stage rotation speed in a post-stage of a damper calculated from motor rotation speeds and an engine rotation speed are used to calculate a resonance influence component, and the resonance influence component is subtracted from the engine rotation speed to calculate a determination rotation speed. Then, the determination rotation speed is used to determine a misfire of an engine. This allows determination of the misfire of the engine with higher accuracy even if resonance caused by torsion of the damper occurs.

31 Claims, 6 Drawing Sheets

US 8,001,832 B2

MISFIRE DETERMINATION DEVICE AND MISFIRE DETERMINATION METHOD FOR INTERNAL COMBUSTION ENGINE AND VEHICLE

This is a 371 national phase application of PCT/JP2007/062489 filed 21 Jun. 2007, claiming priority to Japanese Patent Applications No. JP 2006-238282 filed 1 Sep. 2006, No. JP 2007-057466 filed 7 Mar. 2007, and No. JP 2007-138714 filed 25 May 2007, respectively, the contents of which are incorporated herein by reference.

TECHNICAL FIELD

The present invention relates to a misfire determination device and a misfire determination method for an internal combustion engine and a vehicle, and more particularly to a misfire determination device for an internal combustion engine that determines a misfire of a multicylinder internal combustion engine in which an output shaft is connected to a post-stage shaft in a post-stage via a torsion element, a misfire determination method for determining the misfire of the internal combustion engine, and a vehicle including the misfire determination device.

BACKGROUND ART

In a vehicle in which a motor is used to perform the damping control to cancel a torque change of a crankshaft of the engine, a conventionally proposed misfire determination device for an internal combustion engine of this type calculates a torque correction amount to correct torque outputted from the motor for damping control by the motor, and detects a misfire state of the engine on the basis of the torque correction amount of the motor (for example, see Patent Document 1).

Patent Document 1: Japanese Patent Laid-Open No. 2001-65402

DISCLOSURE OF THE INVENTION

In a device included in a vehicle and connected to a crankshaft of an engine via a torsion element such as a damper in a post-stage, a torque change of the crankshaft by explosion and combustion of the engine causes resonance of the torsion element or the post-stage including the torsion element, and the resonance causes a rotational variation of the crankshaft. This interferes with accurate detection of a misfire of any cylinder of the engine on the basis of the rotational variation of the crank angle. When the motor performs damping control for the torque change of the crank angle of the engine, the resonance of the torsion element and the post-stage including the torsion element may be promoted, and detection accuracy of the misfire of any cylinder of the engine is further reduced.

A misfire determination device and a misfire determination method for an internal combustion engine and a vehicle according to the present invention have an object to determine a misfire of a multicylinder internal combustion engine in which an output shaft is connected to a post-stage shaft in a post-stage via a torsion element with high accuracy.

To achieve at least part of the above described object, a misfire determination device and a misfire determination method for an internal combustion engine and a vehicle according to the present invention adopt the following means.

The present invention provides a misfire determination device for an internal combustion engine that determines a misfire of a multicylinder internal combustion engine in which an output shaft is connected to a post-stage shaft in a post-stage via a torsion element, the misfire determination device including: an output shaft rotation speed detection module that detects an output shaft rotation speed that is a rotation speed of the output shaft; a post-stage shaft rotation speed detection module that detects a post-stage shaft rotation speed that is a rotation speed of the post-stage shaft; a resonance influence component calculation module that calculates a resonance influence component as an influence of resonance caused by torsion of the torsion element on the rotation speed of the output shaft, on the basis of the detected output shaft rotation speed and the detected post-stage shaft rotation speed; and a misfire determination module that determines a misfire of the internal combustion engine on the basis of a detection rotation speed obtained by subtracting the calculated resonance influence component from the detected output shaft rotation speed.

In the misfire determination device for an internal combustion engine of the present invention, the resonance influence component as the influence of the resonance caused by the torsion of the torsion element on the rotation speed of the output shaft of the internal combustion engine is calculated on the basis of the output shaft rotation speed that is the rotation speed of the output shaft of the internal combustion engine and the post-stage shaft rotation speed that is the rotation speed of the post-stage shaft in the post-stage of the torsion element, and the misfire of the internal combustion engine is determined on the basis of the detection rotation speed obtained by subtracting the calculated resonance influence component from the output shaft rotation speed. The misfire of the internal combustion engine is determined on the basis of the detection rotation speed obtained by subtracting the resonance influence component as the influence of the resonance caused by the torsion of the torsion element on the rotation speed of the output shaft of the internal combustion engine from the output shaft rotation speed, and thus the misfire of the internal combustion engine can be determined with high accuracy even if the resonance caused by the torsion of the torsion element occurs.

In the misfire determination device of the invention, the resonance influence component calculation module may calculate a helix angle of the torsion element from the detected output shaft rotation speed and the detected post-stage shaft rotation speed, and calculates the resonance influence component on the basis of the calculated helix angle, a spring constant of the torsion element, and a moment of inertia of the side closer to the internal combustion engine than the torsion element. In this case, the resonance influence component calculation module may calculate the helix angle on the basis of integral calculation of a value obtained by subtracting the detected post-stage shaft rotation speed from the detected output shaft rotation speed, and calculate the resonance influence component on the basis of integral calculation of a constant relation value between the spring constant and the moment of inertia multiplied by the helix angle.

In the misfire determination device of the invention that uses the constant relation value to calculate the resonance influence component, the misfire determination device may further include a relation value learning module that learns the constant relation value, and the resonance influence component calculation module may calculate the resonance influence component using the constant relation value learned by the relation value learning module. Thus, the misfire of the internal combustion engine can be determined with high accuracy by calculation of the resonance influence component using a more adequate constant relation value, even when the constant relation value changes with time. In this case, the relation value learning module may learn the constant relation value on the basis of a rotation angle acceleration of the output shaft calculated on the basis of the detected output shaft rotation speed and the helix angle calculated from the detected output shaft rotation speed and the detected post-stage shaft rotation speed. The constant relation value may be a value obtained by dividing the spring constant by the moment of inertia, and the relation value learning module may learn the constant relation value as a value obtained by dividing the rotation angle acceleration of the output shaft by the helix angle.

In the misfire determination device of the invention that uses the constant relation value to calculate the resonance influence component, aid relation value learning module may learn the constant relation value in a one-cylinder lean operation state that is an operation state of the internal combustion engine in which a fuel injection amount of any one of cylinders of the internal combustion engine is reduced to increase an air/fuel ratio of the cylinder higher than an air/fuel ratio of other cylinders. Thus, a more adequate constant relation value can be learned in the one-cylinder lean operation with the increased influence component of resonance.

In the misfire determination device of the invention that uses the constant relation value to calculate the resonance influence component, the resonance influence component calculation module may reflect a gain and a phase corresponding to the detected output shaft rotation speed on a spring force component obtained by integral calculation of the constant relation value multiplied by the helix angle, to calculate the resonance influence component. The resonance influence component by the torsion element may be assumed as the sum of a component based on a spring force of the torsion element and a component based on a damping force, and the component based on the damping force may be calculated as a gain and a phase relative to the component based on the spring force. The gain and the phase change depending on a frequency of a misfire (corresponding to the rotation speed of the output shaft), and thus the gain and the phase depending on the rotation speed of the output shaft are reflected on the component based on the spring force, thereby allowing more proper calculation of the resonance influence component. This allows more proper determination of the misfire of the internal combustion engine.

In the misfire determination device of the invention that reflects the gain and the phase on the spring force component to calculate the resonance influence component, the gain may be a value calculated by $\{1+(2\pi f)^2 \cdot (C/K)^2\}^{1/2}$, where f is a frequency of a misfire when one cylinder of the internal combustion engine misfires, C is a constant in an damping term of the torsion element, and K is a spring constant of the torsion element, and the phase may be a value calculated by $\tan^{-1}(2\pi f \cdot C/K)$. In this case, the frequency of the misfire may be a specific frequency at a rate of one to two rotations of the output shaft. In this case, furthermore, the spring constant may be a value obtained by multiplying the constant relation value by an initial value of a moment of inertia of the side closer to the internal combustion engine than the torsion element.

Further, in the misfire determination device for an internal combustion engine of the invention, the resonance influence component calculation module may calculate the resonance influence component by a filtering processing of the component calculated on the basis of the detected output shaft rotation speed and the detected post-stage shaft rotation speed, without damping of the frequency of resonance and with the damping of a band of frequencies other than the frequency of resonance. Thus, components of the band of frequencies other than the frequency of resonance can be removed from the resonance influence component. Particularly, when components before the filtering processing are calculated using integral calculation, the filtering processing can also remove components accumulated by the integral calculation. This allows determination of the misfire of the internal combustion engine with higher accuracy. The filtering processing may be a processing using a high-pass filter, or a processing using a comb-like filter leaving multiple order frequency components of the frequency of resonance with the gain=1 and the phase=0.

The present invention also provides a vehicle including: a multicylinder internal combustion engine in which an output shaft is connected to a post-stage shaft in a post-stage via a torsion element; an output shaft rotation speed detection module that detects an output shaft rotation speed that is a rotation speed of the output shaft; a post-stage shaft rotation speed detection module that detects a post-stage shaft rotation speed that is a rotation speed of the post-stage shaft; a resonance influence component calculation module that calculates a resonance influence component as an influence of resonance caused by torsion of the torsion element on the rotation speed of the output shaft on the basis of the detected output shaft rotation speed and the detected post-stage shaft rotation speed; and a misfire determination module that determines a misfire of the internal combustion engine on the basis of a detection rotation speed obtained by subtracting the calculated resonance influence component from the detected output shaft rotation speed.

In the vehicle of the present invention, the resonance influence component as the influence of the resonance caused by the torsion of the torsion element on the rotation speed of the output shaft of the internal combustion engine is calculated on the basis of the output shaft rotation speed that is the rotation speed of the output shaft of the internal combustion engine and the post-stage shaft rotation speed that is the rotation speed of the post-stage shaft in the post-stage of the torsion element, and the misfire of the internal combustion engine is determined on the basis of the detection rotation speed obtained by subtracting the calculated resonance influence component from the output shaft rotation speed. The misfire of the internal combustion engine is determined on the basis of the detection rotation speed obtained by subtracting the resonance influence component as the influence of the resonance caused by the torsion of the torsion element on the rotation speed of the output shaft of the internal combustion engine from the output shaft rotation speed, and thus the misfire of the internal combustion engine can be determined with high accuracy even if the resonance caused by the torsion of the torsion element occurs.

In one preferable structure of the present invention, the vehicle includes an electric motor that can output power to the post-stage shaft in the post-stage of the torsion element, and the post-stage shaft rotation speed detection module also serves as a module that detects an electric motor rotation speed that is a rotation speed of the electric motor, and detects the post-stage shaft rotation speed by converting the detected electric motor rotation speed. Thus, the post-stage shaft rotation speed detection module can also serve as a sensor with high accuracy that detects the rotation speed of the electric motor. Further, even when the electric motor performs damping control for preventing vibration caused by a torque change of an axle, the misfire of the internal combustion engine can be determined with high accuracy.

In another preferable structure of the present invention, the vehicle includes an electric power-mechanical power input output mechanism that is connected to the post-stage shaft and an axle and inputs and outputs power to the post-stage shaft and the axle with input and output of the power, the electric motor is connected to the axle so as to be able to output the power, and the post-stage shaft rotation speed detection module also serves as a module that detects a driving state of the electric power-mechanical power input output mechanism, and detects the post-stage shaft rotation speed by calculation based on the detected electric motor rotation speed and the detected driving state. Thus, even when the electric power-mechanical power input output mechanism performs damping control for preventing vibration caused by a torque change of an axle, the misfire of the internal combustion engine can be determined with high accuracy.

In the vehicle of the invention with the electric power-mechanical power input output mechanism, aid resonance influence component calculation module may calculate a helix angle of the torsion element from the detected output shaft rotation speed and the detected post-stage shaft rotation speed, and calculates the resonance influence component on the basis of the calculated helix angle, a spring constant of the torsion element, and a moment of inertia of the side closer to the internal combustion engine than the torsion element. In this case, the resonance influence component calculation module may calculate the helix angle on the basis of integral calculation of a value obtained by subtracting the detected post-stage shaft rotation speed from the detected output shaft rotation speed, and calculates the resonance influence component on the basis of integral calculation of a constant relation value between the spring constant and the moment of inertia multiplied by the helix angle.

In the vehicle of the invention that uses the constant relation value to calculate the resonance influence component, the vehicle may further include a relation value learning module that learns the constant relation value, and the resonance influence component calculation module may calculate the resonance influence component using the constant relation value learned by the relation value learning module. Thus, the misfire of the internal combustion engine can be determined with high accuracy by calculation of the resonance influence component using a more adequate constant relation value, even when the constant relation value changes with time.

In the vehicle of the invention that uses the constant relation value to calculate the resonance influence component, the resonance influence component calculation module may reflect a gain and a phase corresponding to the detected output shaft rotation speed on a spring force component obtained by integral calculation of the constant relation value multiplied by the helix angle, to calculate the resonance influence component. The resonance influence component by the torsion element may be assumed as the sum of a component based on a spring force of the torsion element and a component based on a damping force, and the component based on the damping force may be calculated as a gain and a phase relative to the component based on the spring force. The gain and the phase change depending on a frequency of a misfire (corresponding to the rotation speed of the output shaft), and thus the gain and the phase depending on the rotation speed of the output shaft are reflected on the component based on the spring force, thereby allowing more proper calculation of the resonance influence component. This allows more proper determination of the misfire of the internal combustion engine. Here, the gain may be a value calculated by $\{1+(2\pi f)^2 \cdot (C/K)^2\}^{1/2}$, where f is a frequency of a misfire when one cylinder of the internal combustion engine misfires, C is a constant in an damping term of the torsion element, and K is a spring constant of the torsion element, and the phase may be a value calculated by $\tan-1 (2\pi f \cdot C/K)$.

In the vehicle of the invention, the resonance influence component calculation module may calculate the resonance influence component by performing a filtering processing of a component calculated on the basis of the detected output shaft rotation speed and the detected post-stage shaft rotation speed, without damping of the frequency of resonance and with the damping of a band of frequencies other than the frequency of resonance. Thus, components of the band of frequencies other than the frequency of resonance can be removed from the resonance influence component. Particularly, when components before the filtering processing are calculated using integral calculation, the filtering processing can also remove components accumulated by the integral calculation. This allows determination of the misfire of the internal combustion engine with higher accuracy. The filtering processing may be a processing using a high-pass filter, or a processing using a comb-like filter leaving multiple order frequency components of the frequency of resonance with a gain=1 and a phase=0.

The present invention provides a misfire determination method for an internal combustion engine that determines a misfire of a multicylinder internal combustion engine in which an output shaft is connected to a post-stage shaft in a post-stage via a torsion element, the misfire determination method including: calculating a resonance influence component as an influence of resonance caused by torsion of the torsion element on a rotation speed of the output shaft on the basis of an output shaft rotation speed a rotation speed of the output shaft and a post-stage shaft rotation speed as a rotation speed of the post-stage shaft; and determining a misfire of the internal combustion engine on the basis of a detection rotation speed obtained by subtracting the calculated resonance influence component from the detected output shaft rotation speed.

In the misfire determination method for an internal combustion engine of the present invention, the resonance influence component as the influence of the resonance caused by the torsion of the torsion element on the rotation speed of the output shaft of the internal combustion engine is calculated on the basis of the output shaft rotation speed that is the rotation speed of the output shaft of the internal combustion engine and the post-stage shaft rotation speed that is the rotation speed of the post-stage shaft in the post-stage of the torsion element, and the misfire of the internal combustion engine is determined on the basis of the detection rotation speed obtained by subtracting the calculated resonance influence component from the output shaft rotation speed. The misfire of the internal combustion engine is determined on the basis of the detection rotation speed obtained by subtracting the resonance influence component as the influence of the resonance caused by the torsion of the torsion element on the rotation speed of the output shaft of the internal combustion engine from the output shaft rotation speed, and thus the misfire of the internal combustion engine can be determined with high accuracy even if the resonance caused by the torsion of the torsion element occurs.

In the misfire determination method of the invention, the method may calculate a helix angle on the basis of integral calculation of a value obtained by subtracting the post-stage shaft rotation speed from the output shaft rotation speed, and calculates the resonance influence component on the basis of integral calculation of a constant relation value between the spring constant and the moment of inertia multiplied by the helix angle.

In the misfire determination method of the invention that uses the constant relation value to calculate the resonance influence component, the method may include learning a constant relation value in a one-cylinder lean operation state that is an operation state of the internal combustion engine in which a fuel injection amount of any one of cylinders of the internal combustion engine is reduced to increase an air/fuel ratio of the cylinder higher than an air/fuel ratio of other cylinders, the constant relation value being obtained by dividing the rotation angle acceleration of the output shaft calculated on the basis of the output shaft rotation speed by the helix angle calculated from the output shaft rotation speed and the post-stage shaft rotation speed, and calculating the resonance influence component using the learned constant relation value. Thus, the misfire of the internal combustion engine can be determined with high accuracy by calculation of the resonance influence component using a more adequate constant relation value, even when the constant relation value changes with time. Further, a more adequate constant relation value can be learned in the one-cylinder lean operation with the increased influence component of resonance.

In the misfire determination method of the invention that uses the constant relation value to calculate the resonance influence component, the method may reflect a gain and a phase corresponding to the output shaft rotation speed on a spring force component obtained by integral calculation of the constant relation value multiplied by the helix angle, to calculate the resonance influence component. The resonance influence component by the torsion element may be assumed as the sum of a component based on a spring force of the torsion element and a component based on a damping force, and the component based on the damping force may be calculated as a gain and a phase relative to the component based on the spring force. The gain and the phase change depending on a frequency of a misfire (corresponding to the rotation speed of the output shaft), and thus the gain and the phase depending on the rotation speed of the output shaft are reflected on the component based on the spring force, thereby allowing more proper calculation of the resonance influence component. This allows more proper determination of the misfire of the internal combustion engine.

In the misfire determination method of the invention, the method may calculate the resonance influence component by performing a filtering processing of a component calculated on the basis of the output shaft rotation speed and the post-stage shaft rotation speed, using a high-pass filter without damping of the frequency of resonance. The filtering processing may be a processing of a component calculated on the basis of the output shaft rotation speed and the post-stage shaft rotation speed, using a comb-like filter leaving multiple order frequency components of the frequency of resonance with a gain=1 and a phase=0. Thus, components of the band of frequencies other than the frequency of resonance can be removed from the resonance influence component. Particularly, when components before the filtering processing are calculated using integral calculation, the filtering processing can also remove components accumulated by the integral calculation. This allows determination of the misfire of the internal combustion engine with higher accuracy.

BEST MODE FOR CARRYING OUT THE INVENTION

Figure 1:
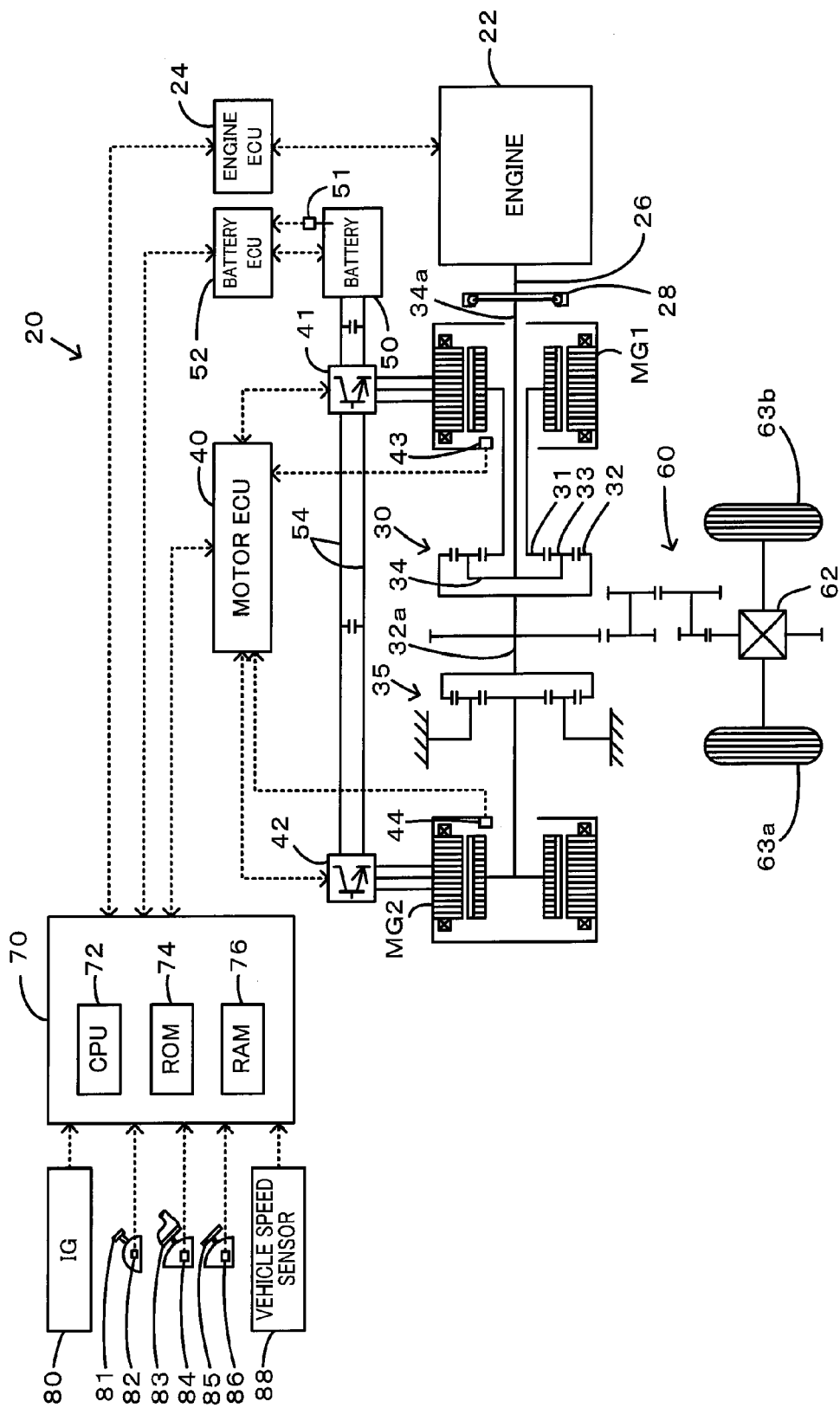
FIG. 1 is a schematic block diagram of a configuration of a hybrid vehicle 20 including a misfire determination device for an internal combustion engine according to one embodiment of the invention.

Now, the best mode for carrying out the present invention will be described with reference to an embodiment. FIG. 1 is a schematic block diagram of a configuration of a hybrid vehicle 20 including a misfire determination device for an internal combustion engine according to an embodiment of the present invention. The hybrid vehicle 20 in the embodiment includes, as shown, an engine 22, a three shaft-type power distribution and integration mechanism 30 connected to a crankshaft 26 as an output shaft of the engine 22 via a damper 28 as a torsion element, a motor MG1 that is connected to the power distribution and integration mechanism 30 and can generate electric power, a reduction gear 35 mounted to a ring gear shaft 32a connected to the power distribution and integration mechanism 30, a motor MG2 connected to the reduction gear 35, and a hybrid electronic control unit 70 that controls the entire vehicle. An engine electronic control unit 24 that mainly controls the engine 22, a crank position sensor 140 described later that detects a rotational position of the crankshaft 26 of the engine 22, and rotational position detection sensors 43 and 44 that detect rotational positions of the motor MG1 and a motor MG2 correspond to the misfire determination device for an internal combustion engine of the embodiment.

Figure 2:
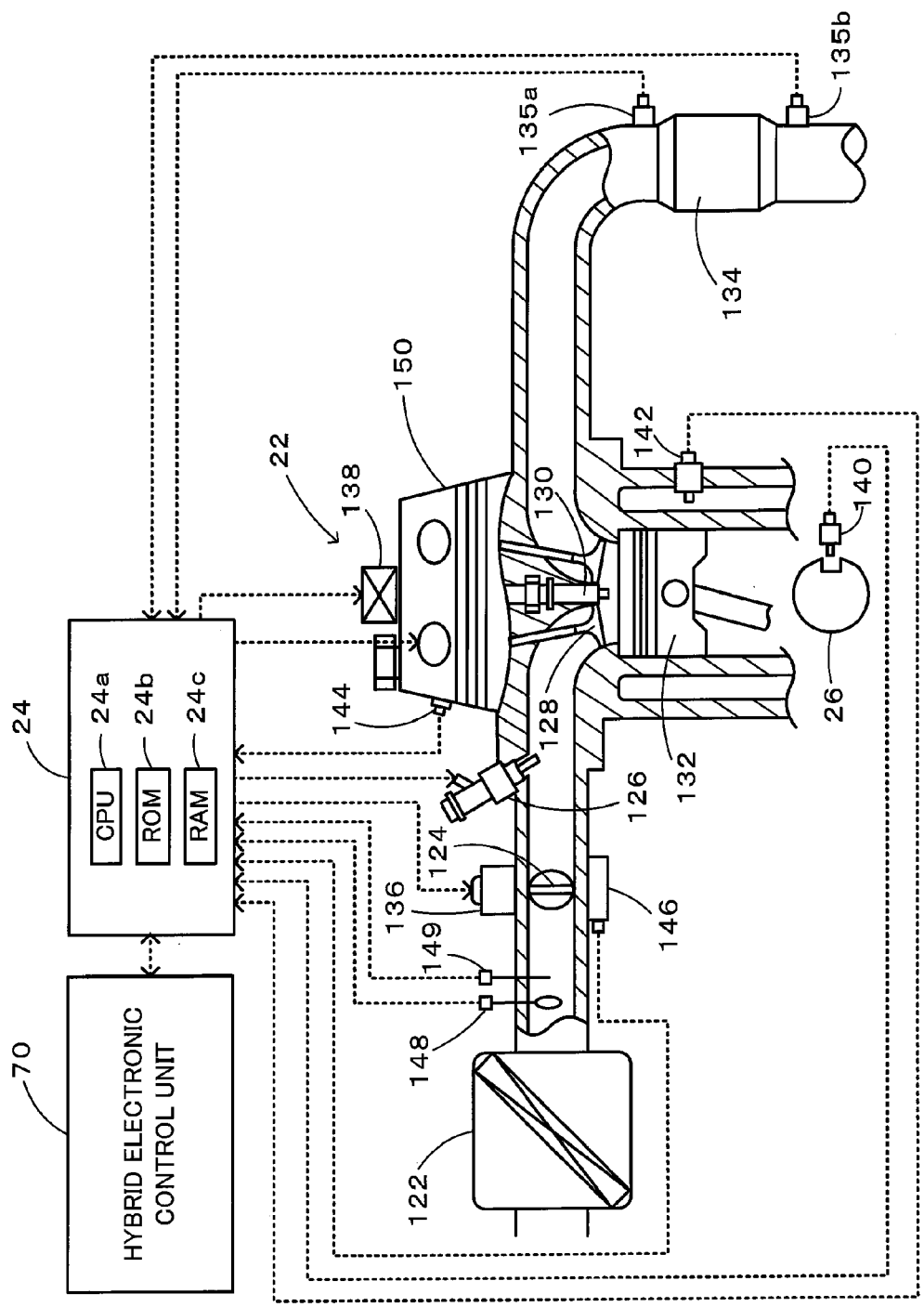
FIG. 2 is a schematic block diagram of a configuration of the internal combustion engine 22.

The engine 22 is configured as an eight-cylinder internal combustion engine that can output power using hydrocarbon fuel such as gasoline or gas oil. As shown in FIG. 2, air cleaned by an air cleaner 122 is taken in via a throttle valve 124 and gasoline is injected from a fuel injection valve 126 provided in each cylinder to mix the intake air and the gasoline, the air/fuel mixture is taken into a combustion chamber via an intake valve 128 and subjected to explosion and combustion by electric spark from an ignition plug 130, and reciprocating motion of a piston 132 pushed down by energy of the explosion and combustion is converted into rotation motion of the crankshaft 26. Exhaust gas from the engine 22 is exhausted to the outside via a cleaning device 134 (three way catalyst) for cleaning harmful components such as carbon monoxide (CO), hydrocarbon (HC), or nitrogen oxides (NOx).

The engine 22 is controlled by the engine electronic control unit (hereinafter referred to as an engine ECU) 24. The engine ECU 24 is configured as a microprocessor mainly including a CPU 24a, a ROM 24b that stores a processing program, a RAM 24c that temporarily stores data, and unshown input and output ports and communication ports. To the engine ECU 24, for example, signals from various sensors that detect a state of the engine 22, a crank position (crank angle CA) from the crank position sensor 140 that detects a rotational position (crank angle CA) of the crankshaft 26, cooling water temperature from a water temperature sensor 142 that detects a temperature of cooling water of the engine 22, a cam position from a cam position sensor 144 that detects a rotational position of a cam shaft that opens and closes the intake valve 128 and an exhaust valve that take in and exhaust air to and from the combustion chamber, a throttle position from a throttle valve position sensor 146 that detects a position of the throttle valve 124, an airflow meter signal AF from an airflow meter 148 mounted to an intake pipe, an intake air temperature from a temperature sensor 149 also mounted to the intake pipe, an air/fuel ratio AF from an air/fuel ratio sensor 135a, and an oxygen signal from an oxygen sensor 135b are inputted via the input port. From the engine ECU 24, various control signals for driving the engine 22, for example, a drive signal to the fuel injection valve 126, a drive signal to a throttle motor 136 that adjusts the position of the throttle valve 124, a control signal to an ignition coil 138 integrated with an igniter, and a control signal to a variable valve timing mechanism 150 that can change opening and closing timing of the intake valve 128 are outputted via the output port. The engine ECU 24 communicates with the hybrid electronic control unit 70, and controls to operate the engine 22 by a control signal from the hybrid electronic control unit 70 and outputs data on an operation state of the engine 22 as required. The crank position sensor 140 is configured as an electromagnetic pickup sensor including a timing rotor that is mounted to rotate in synchronization with the crankshaft 26 and has teeth at 10° intervals and tooth-missing spaces corresponding to two teeth for detecting a reference position, and generates a shaped wave for each 10° rotation of the crankshaft 26. In the engine ECU 24, a rotation speed for each 30° rotation of the crankshaft 26 is calculated as a rotation speed Ne of the engine 22 based on the shaped wave from the crank position sensor 140.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the reduction gear 35 via ring gear shaft 32a. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the driving wheels 63a and 63b via the gear mechanism 60, and the differential gear 62 from ring gear shaft 32a.

Both the motors MG1 and MG2 are known synchronous motor generators that are driven as a generator and as a motor, and supply and receive electric power to and from a battery 50 via inverters 41 and 42. Power lines 54 connecting between the inverters 41 and 42 and the battery 50 are configured as a positive electrode bus line and a negative electrode bus line shared by the inverters 41 and 42, and electric power generated by one of the motors MG1 and MG2 can be consumed by the other. Thus, the battery 50 may thus be charged with surplus electric power generated by either of the motors MG1 and MG2, while being discharged to supplement insufficient electric power. If an electric power balance is achieved by the motors MG1 and MG2, the battery 50 is neither charged nor discharged. Both of the motors MG1 and MG2 are controlled to be driven by a motor electronic control unit (hereinafter referred to as a motor ECU) 40. To the motor ECU 40, signals required for controlling to drive the motors MG1 and MG2 such as signals from rotational position detection sensors 43 and 44 that detect rotational positions of rotors of the motors MG1 and MG2 or phase currents applied to the motors MG1 and MG2 detected by an unshown current sensor are inputted, and from the motor ECU 40, switching control signals to the inverters 41 and 42 are outputted. The motor ECU 40 communicates with the hybrid electronic control unit 70, controls to drive the motors MG1 and MG2 by control signals from the hybrid electronic control unit 70 and outputs data on operation states of the motors MG1 and MG2 to the hybrid electronic control unit 70 as required. The rotational position detection sensors 43 and 44 are configured by resolvers, and the motor ECU 40 calculates rotation speeds Nm1 and Nm2 of the motors MG1 and MG2 at predetermined time intervals (for example, at 50 μsec or 100 μsec intervals) on the basis of signals from the rotational position detection sensors 43 and 44.

The battery 50 is under control and management of a battery electronic control unit (hereafter referred to as battery ECU) 52. The battery ECU 52 inputs various signals required for management and control of the battery 50, for example, an inter-terminal voltage from a voltage sensor (not shown) located between terminals of the battery 50, a charge-discharge current from a current sensor (not shown) located on the power line 54 connecting with an output terminal of the battery 50, and a battery temperature Tb from a temperature sensor 51 attached to the battery 50. The battery ECU 52 outputs data regarding the operating conditions of the battery 50 to the hybrid electronic control unit 70 by communication according to the requirements. For the purpose of management and control of the battery 50, the battery ECU 52 computes a remaining charge level or state of charge SOC of the battery 50 from integration of the charge-discharge current measured by the current sensor.

The hybrid electronic control unit 70 is constructed as a microprocessor including a CPU 72, a ROM 74 that stores processing programs, a RAM 76 that temporarily stores data, and a non-illustrated input-output port, and a non-illustrated communication port. The hybrid electronic control unit 70 receives various inputs via the input port: an ignition signal from an ignition switch 80, a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, and a vehicle speed V from a vehicle speed sensor 88. The hybrid electronic control unit 70 communicates with the engine ECU 24, the motor ECU 40, and the battery ECU 52 via the communication port to transmit diverse control signals and data to and from the engine ECU 24, the motor ECU 40, and the battery ECU 52, as mentioned previously.

The hybrid vehicle 20 of the embodiment thus constructed calculates a torque demand to be output to the ring gear shaft 32a functioning as the drive shaft, based on observed values of a vehicle speed V and an accelerator opening Acc, which corresponds to a driver's step-on amount of an accelerator pedal 83. The engine 22 and the motors MG1 and MG2 are subjected to operation control to output a required level of power corresponding to the calculated torque demand to the ring gear shaft 32a. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32a. The charge-discharge drive mode controls the operations of the engine 22 to output a quantity of power equivalent to the sum of the required level of power and a quantity of electric power consumed by charging the battery 50 or supplied by discharging the battery 50, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32a, simultaneously with charge or discharge of the battery 50. The motor drive mode stops the operations of the engine 22 and drives and controls the motor MG2 to output a quantity of power equivalent to the required level of power to the ring gear shaft 32a.

Figure 3:
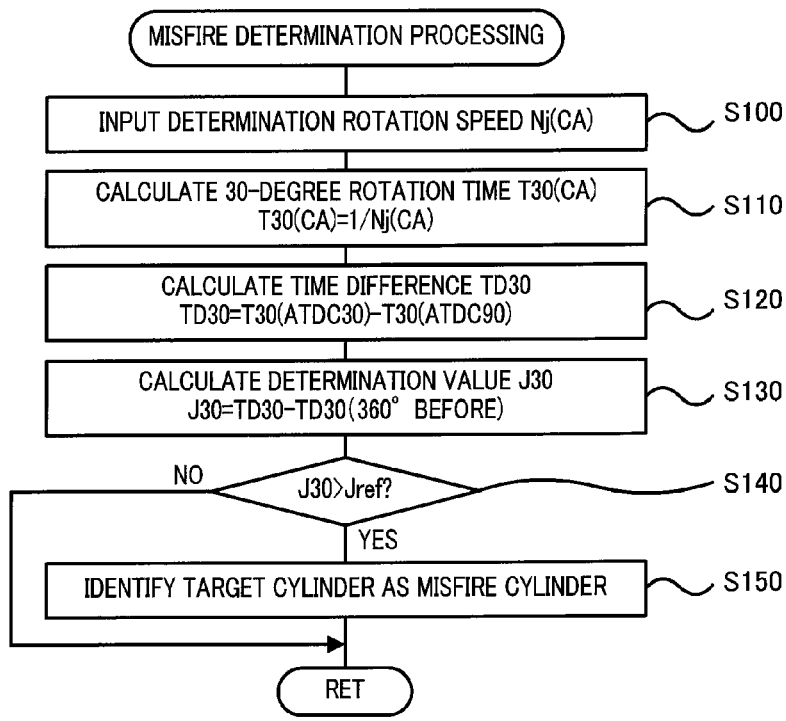
FIG. 3 is a flowchart showing a misfire determination processing.

Next, an operation of determining whether any cylinder of the engine 22 misfires in the hybrid vehicle 20 in the embodiment thus configured will be described. FIG. 3 is a flowchart showing an example of a misfire determination processing performed by the engine ECU 24. This routine is repeatedly performed at predetermined time intervals.

Figure 4:
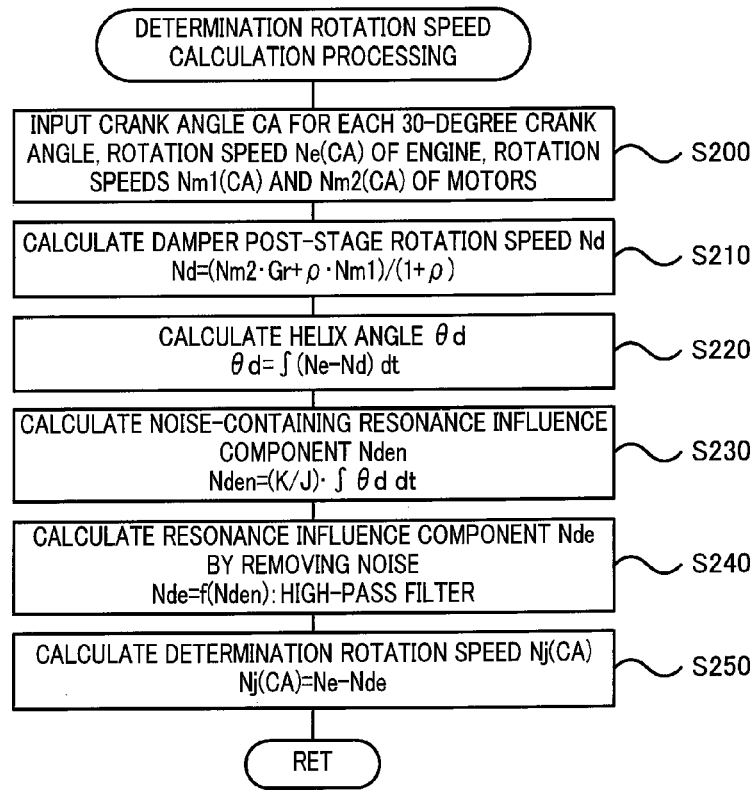
FIG. 4 is a flowchart showing a determination rotation speed calculation processing.

When the misfire determination processing is started, the CPU 24a of the engine ECU 24 first inputs a determination rotation speed Nj(CA) (Step S100), and performs a processing of calculating a 30-degree rotation time T30(CA) required for the crankshaft 26 to rotate 30 degrees from an inverse of the inputted determination rotation speed Nj(CA) (Step S110). The determination rotation speed Nj(CA) is a rotation speed obtained by subtracting an influence component of resonance (resonance influence component) Nde caused by torsion of the damper 28 from the rotation speed Ne of the engine 22, and calculated by a determination rotation speed calculation processing illustrated in FIG. 4. For simplicity of description, the calculation processing of the determination rotation speed Nj (CA) will be described later.

Then, a difference [T30(ATDC30)−T30(ATDC90)] between 30-degree rotation times T30(ATDC30) and T30 (ATDC90) 30 degrees (ATDC30) and 90 degrees (ATDC90) after a top dead center of a compression stroke of a target cylinder of misfire determination is calculated as a time difference TD30 (Step S120), a difference between the calculated time difference TD30 and a time difference TD30 calculated 360 degrees before (a 360° difference between the time differences TD30) [TD30−TD30 (360° before)] is calculated as a determination value J30 (Step S130), the calculated determination value J30 is compared with a threshold Jref (Step S140), it is determined that the target cylinder misfires when the determination value J30 is higher than the threshold Jref (Step S150) to finish the misfire determination processing, and it is determined that the target cylinder does not misfire when the determination value J30 is not higher than the threshold Jref to finish the misfire determination processing. The time difference TD30 becomes a negative value when the cylinder is in normal combustion (explosion) and becomes a positive value when the cylinder misfires from the degree of acceleration of the piston 132 by combustion (explosion) of the engine 22 in view of the angle from the compression top dead center. Thus, the determination value J30 becomes a value near zero when the target cylinder is in normal combustion (explosion), and becomes a positive value higher than an absolute value of the time difference TD30 of the cylinder in normal combustion when the target cylinder misfires. Thus, the threshold Jref is set as a value near the absolute value of around the time difference TD30 of the cylinder in normal combustion, thereby allowing determination of the misfire of the target cylinder with high accuracy.

Next, the calculation processing of the determination rotation speed Nj (CA) will be described. In the calculation processing of the determination rotation speed Nj (CA), as shown in the determination rotation speed calculation processing in FIG. 4, the CPU 24a of the engine ECU 24 first inputs the crank angle CA for each crank angle of 30°, the rotation speed Ne(CA) of the engine 22, and the rotation speeds Nm1(CA) and Nm2(CA) of the motors MG1 and MG2 (Step S200), and the rotation speeds Nm1(CA) and Nm2(CA) of the inputted motors MG1 and MG2, a gear ratio ρ (the number of teeth of a sun gear/the number of teeth of a ring gear) of the power distribution and integration mechanism 30, and a gear ratio Gr of the reduction gear 35 are used to calculate a rotation speed of the side closer to the power distribution and integration mechanism 30 than the damper 28, that is, a damper post-stage rotation speed Nd(CA) that is a rotation speed of a carrier shaft 34a by the following expression (1) (Step S210). As the rotation speed Ne(CA) of the engine 22, a rotation speed Ne corresponding to the crank angle CA is inputted among rotation speeds Ne of the engine 22 calculated for each 30° rotation of the crankshaft 26 on the basis of the shaped wave from the crank position sensor 140, and as the rotation speeds Nm1(CA) and Nm2 (CA) of the motors MG1 and MG2, rotation speeds corresponding to the crank angle CA among rotation speeds calculated on the basis of the signals from the rotational position detection sensors 43 and 44 are inputted from the motor ECU 40.

$$Nd(CA)=[Nm2(CA)\cdot Gr+\rho\cdot Nm1(CA)]/(1+\rho) \qquad (1)$$

Then, the rotation speed Ne(CA) of the engine 22 and the calculated damper post-stage rotation speed Nd(CA) are used to calculate a helix angle θd(CA) of the damper 28 by the following expression (2) (Step S220), and a constant relation value (K/J) that is a ratio between a spring constant K of the damper 28 and a moment of inertia J of the side closer to the engine 22 than the damper 28, and the calculated helix angle θd(CA) are used to calculate a noise-containing resonance influence component Nden (CA) containing low frequency noise as an influence of the resonance of the damper 28 on the rotation speed of the engine 22 by the expression (3) (Step S230).

$$\theta d(CA)=\int [Ne(CA)-Nd(CA)]dt \qquad (2)$$

$$Nden(CA)=(K/J)\cdot\int\theta d(CA)dt \qquad (3)$$

Then, to remove the low frequency noise of the noise-containing resonance influence component Nden(CA), a high-pass filter is applied to the noise-containing resonance influence component Nden(CA) to calculate a resonance influence component Nde(CA) (Step S240), and the calculated resonance influence component Nde(CA) is subtracted from the rotation speed Ne(CA) of the engine 22 to calculate the determination rotation speed Nj(CA) (Step S250). For the high-pass filter, it is only necessary that a cutoff frequency is set so as not to damp a frequency band of resonance of the damper 28 but to damp a band of frequency lower than the frequency band of resonance. The high-pass filter is applied to allow removal of low frequency components accumulated by the integral calculation by the expressions (2) and (3).

The determination rotation speed Nj(CA) calculated by the determination rotation speed calculation processing is obtained by subtracting the resonance influence component Nde(CA) that is a component of an influence of resonance caused by the torsion of the damper 28 from the rotation speed detected by the crank position sensor 140, that is, the rotation speed Ne of the engine 22 influenced by the resonance caused by the torsion of the damper 28, and thus reflects only a rotational variation caused by explosion (combustion) of each cylinder of the engine 22 or a misfire. Thus, the determination rotation speed Nj(CA) is used to determine a misfire of the engine 22, thereby allowing determination of the misfire of the engine 22 with higher accuracy even if the resonance caused by the torsion of the damper 28 occurs.

Figure 5:
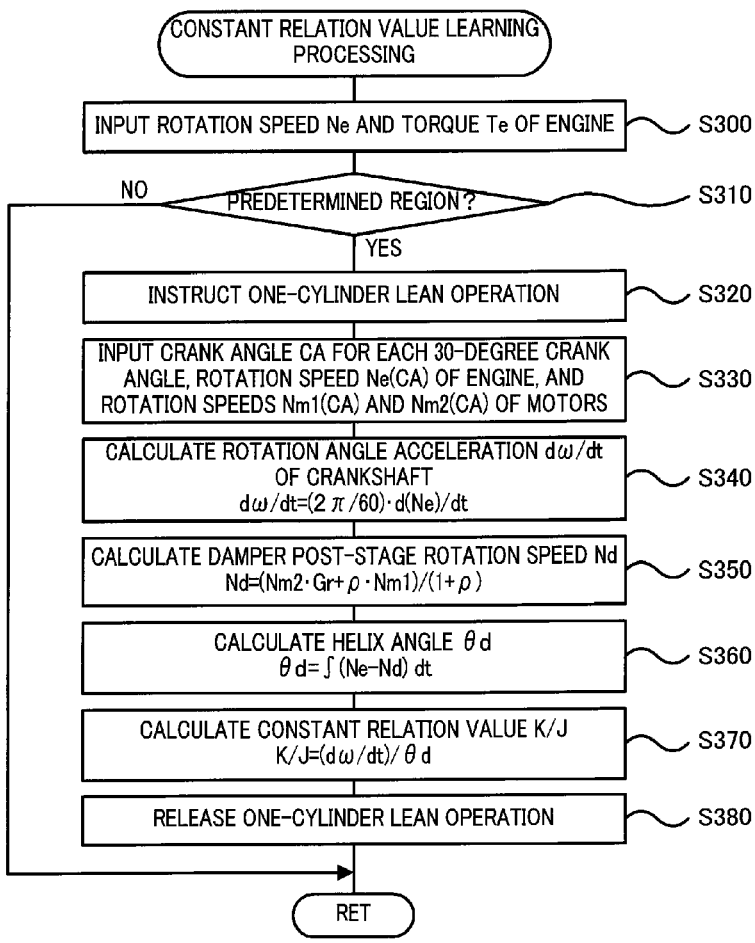
FIG. 5 is a flowchart showing a constant relation value learning processing.

Next, a processing of learning a constant relation value (K/J) used in calculation of the determination rotation speed Nj(CA) will be described. FIG. 5 is a flowchart showing an example of a constant relation value learning processing. This processing is repeatedly performed at predetermined time intervals (for example, every time the constant relation value is learned once for several trips).

When the constant relation value learning processing is started, the CPU 24a of the engine ECU 24 first inputs the rotation speed Ne and torque Te of the engine 22 (Step S300), determines whether the operation state of the engine 22 is suitable for learning the constant relation value (Step S310), and finishes this processing without learning when determining that the operation state of the engine 22 is not suitable for learning. In the embodiment, as the torque Te of the engine 22, torque Te outputted from the engine 22 is calculated and inputted on the basis of the rotation speed Ne of the engine 22, an opening of the throttle valve 124, and an accelerator opening Acc. The operation state suitable for learning the constant relation value is, for example, a state where the engine 22 stably performs a self-sustaining operation at 1,000 rpm or 1,500 rpm or a state where the engine 22 operates with a low load.

When it is determined that the operation state of the engine 22 is suitable for learning, an instruction is outputted to enter a one-cylinder lean operation state in which a fuel injection amount of a particular cylinder (for example, a first cylinder) among the cylinders of the engine 22 is smaller than that of other cylinders and the particular cylinder only enters a lean fuel injection state (Step S320), after the one-cylinder lean operation state is entered, the crank angle CA for each crank angle of 30°, the rotation speed Ne(CA) of the engine 22, and the rotation speeds Nm1(CA) and Nm2(CA) of the motors MG1 and MG2 are inputted (Step S330), a rotation angle acceleration dω/dt(CA) of the crankshaft 26 is calculated on the basis of the inputted rotation speed Ne of the engine 22 (Step S340), and the damper post-stage rotation speed Nd(CA) (rotation speed of the carrier 34) is calculated by the expression (1) and the helix angle θd(CA) of the damper 28 is calculated by the expression (2) (Steps S350 and S360). In the one-cylinder lean operation state, the fuel injection amount of the particular cylinder is reduced to increase a torque change by explosion (combustion) in the particular cylinder, and thus induce the resonance caused by the torsion of the damper 28 to increase an influence of the constant relation value (K/J).

Then, as in the following expression (4), the rotation angle acceleration dω/dt(CA) of the crankshaft 26 is divided by the helix angle θd(CA) of the damper 28 to calculate the constant relation value (K/J) and the constant relation value is updated with the calculated constant relation value (K/J) (Step S370), and the one-cylinder lean operation state is released (Step S380) to finish the learning processing. The expression (4) is based on the fact that torque obtained by multiplying the spring constant K of the damper 28 by the helix angle θd(CA) of the damper 28 is equal to torque obtained by multiplying the moment of inertia J of the side closer to the engine 22 than the damper 28 by the rotation angle acceleration dω/dt(CA) of the crankshaft 26 (the expression (5)). The updated constant relational expression (K/J) is used for subsequent calculation of the subsequent determination rotation speed Nj(CA).

$$K/J=[d\omega/dt(CA)]/\theta d \qquad (4)$$

$$k \cdot \theta d = J \cdot d\omega/dt(CA) \qquad (5)$$

According to the misfire determination device for an internal combustion engine included in the hybrid vehicle 20 in the embodiment described above, the rotation speed Ne(CA) of the engine 22 and the damper post-stage rotation speed Nd(CA) in the post-stage of the damper 28 are used to calculate the resonance influence component Nde(CA), the resonance influence component Nde(CA) is subtracted from the rotation speed Ne(CA) of the engine 22 to calculate the determination rotation speed Nj(CA), and the misfire of the engine 22 is determined on the basis of the determination rotation speed Nj(CA), thereby allowing determination of the misfire of the engine 22 with higher accuracy even if the resonance caused by the torsion of the damper 28 occurs. Further, the high-pass filter is applied for removing the low frequency noise in calculation of the determination rotation speed Nj(CA), and thus the low frequency components accumulated by the integral calculation in calculation of the helix angle θd(CA) of the damper 28 and the noise-containing resonance influence component Nden(CA) can be removed. This allows determination of the misfire of the engine 22 with higher accuracy.

According to the misfire determination device for an internal combustion engine included in the hybrid vehicle 20 in the embodiment, the constant relation value (K/J) is learned, and thus the determination rotation speed Nj(CA) can be calculated more properly even if the spring constant K changes with time. This allows determination of the misfire of the engine 22 with higher accuracy even if the spring constant K changes with time. Further, the constant relation value (K/J) is learned in the one-cylinder lean operation state, and thus the constant relation value (K/J) can be learned more properly. Further, a reduction in emission by learning can be prevented.

The determination processing of the misfire in the misfire determination device for an internal combustion engine included in the hybrid vehicle 20 in the embodiment is not based on the assumption that the damping control for preventing vibration based on the torque change of the ring gear shaft 32a connected to the axle is performed by the motor MG1 and the motor MG2. The misfire of the engine 22, however, can be determined by the misfire determination processing with the damping control being performed by the motor MG1 and the motor MG2.

In the misfire determination device for an internal combustion engine included in the hybrid vehicle 20 in the embodiment, the helix angle θd(CA) of the damper 28 is calculated from the rotation speed Ne(CA) of the engine 22 and the damper post-stage rotation speed Nd(CA) in the post-stage of the damper 28, and the noise-containing resonance influence component Nden(CA) is calculated from the spring constant K, the constant relation value (K/J) and the helix angle θd(CA) of the damper 28, the high-pass filtering processing of the noise-containing resonance influence component Nden (CA) is performed to calculate the resonance influence component Nde(CA), the resonance influence component Nde (CA) is subtracted from the rotation speed Ne(CA) of the engine 22 to calculate the determination rotation speed Nj(CA), and the misfire of the engine 22 is determined on the basis of the determination rotation speed Nj(CA). Any calculation methods, however, may be used as long as the rotation speed Ne(CA) of the engine 22 and the damper post-stage rotation speed Nd(CA) in the post-stage of the damper 28 are used to calculate the resonance influence component Nde (CA). Also, the resonance influence component Nden(CA) may be calculated without performing the high-pass filtering processing of the noise-containing resonance influence component Nden(CA).

In the misfire determination device for an internal combustion engine included in the hybrid vehicle 20 in the embodiment, the damper post-stage rotation speed Nd is calculated from the rotation speeds Nm1 and Nm2 of the motors MG1 and MG2. A rotation speed sensor, however, may be mounted to the carrier shaft 34a to directly detect a rotation speed of the carrier shaft 34a as the damper post-stage rotation speed Nd.

In the misfire determination device for an internal combustion engine included in the hybrid vehicle 20 in the embodiment, the constant relation value (K/J) is learned with the operation state of the engine 22 being the one-cylinder lean operation state. The constant relation value (K/J), however, may be learned without the operation state of the engine 22 being the one-cylinder lean operation state.

In the misfire determination device for an internal combustion engine included in the hybrid vehicle 20 in the embodiment, the constant relation value (K/J) is learned. However, when the spring constant K of the damper 28 slightly changes or does not change with time, it is allowed that the constant relation value (K/J) is not learned.

Figure 6:
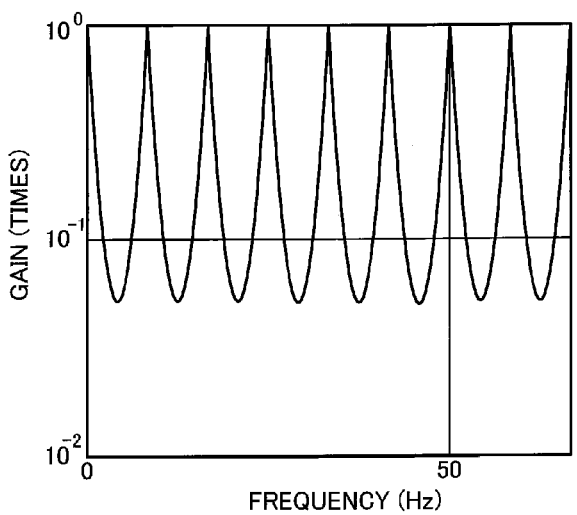
FIG. 6 shows an example of a frequency characteristic of a comb filter.

In the misfire determination device for an internal combustion engine included in the hybrid vehicle 20 in the embodiment, the high-pass filter is applied to the noise-containing resonance influence component Nden(CA) for removing the low frequency noise of the noise-containing resonance influence component Nden(CA) to calculate the resonance influence component Nde(CA). Any filter, however, may be used as long as it removes the low frequency noise from the noise-containing resonance influence component Nden(CA) to calculate the resonance influence component Nde(CA). For example, when the frequency of resonance is a frequency at a crank angle of 720°, and the processing is performed using data for each crank angle of 30°, a comb-like filter (so-called comb filter) leaving multiple order frequency components of the frequency at the crank angle of 720° that is the frequency of resonance with a gain=1 and a phase=0 and expressed by a difference equation in the following expression (6) and a high-pass filter for greatly removing components of the frequency near the value of zero may be superimposed and applied to the noise-containing resonance influence component Nden(CA) to calculate the resonance influence component Nde(CA). In the expression (6), y is an output signal, u is an input signal, NSM is a kind of annealing coefficient. The difference equation in the expression (6) is converted into a transfer function expression and expressed by the expression (7). In the expression (7), z is a z-transformation operator. FIG. 6 shows an example of a frequency characteristic of the comb filter. The comb filter and the high-pass filter are superimposed because the comb filter leaves the multiple order frequency components of the frequency at the crank angle of 720° that is the frequency of resonance with the gain=1 and the phase=0, and thus also leaves the component of the frequency of the value of zero with the gain=1 and the phase=0, which is to be removed. Thus, the filtering processing is not limitedly performed using two filters of the comb filter and the high-pass filter superimposed, but may be performed using the comb filter and the high-pass filter integrated into one filter. A difference equation of a filter when the comb filter and the high-pass filter are integrated into one filter in the case where the frequency of resonance is the frequency at the crank angle of 720° and the processing is performed using data for each crank angle of 30° is expressed by the expression (8), and a transfer function expression thereof is expressed by the expression (9). When the frequency of resonance is not the frequency at the crank angle of 720°, it is only necessary that the comb filter is designed depending on the frequency of resonance. For example, when the processing is performed using data for each crank angle of 30°, it is only necessary that [k-24] in the expression (6) is replaced by [k-12] when the frequency of resonance is the frequency of the crank angle of 360°, and [k-24] in the expression (6) is replaced by [k-6] when the resonance influence component is the frequency of the crank angle of 180°. The processing may be performed by data for each crank angle different from the data for each crank angle of 30°. For example, when the frequency of resonance is the frequency at the crank angle of 720°, it is only necessary that [k-24] in the expression (6) is replaced by [k-72] and the processing is performed using data for each crank angle of 10°, and [k-24] in the expression (6) is replaced by [k-144] when the processing is performed using data for each crank angle of 5°.

$$y[k]=y[k-24]+(u[k]-y[k-24])/NSM \quad (6)$$

$$G[z]=1/[NSM-(NSM-1)z-24] \quad (7)$$

$$y[k]=0.963y[k-1]+(7/8)y[k-24]-(7/8)\cdot 0.963y[k-25]+(0.982/8)u[k-1] \quad (8)$$

$$G[z]=0.982(1-z-1)/(8-8\cdot 0.963z-1-7z-24+7\cdot 0.963z-25) \quad (9)$$

Figure 7:
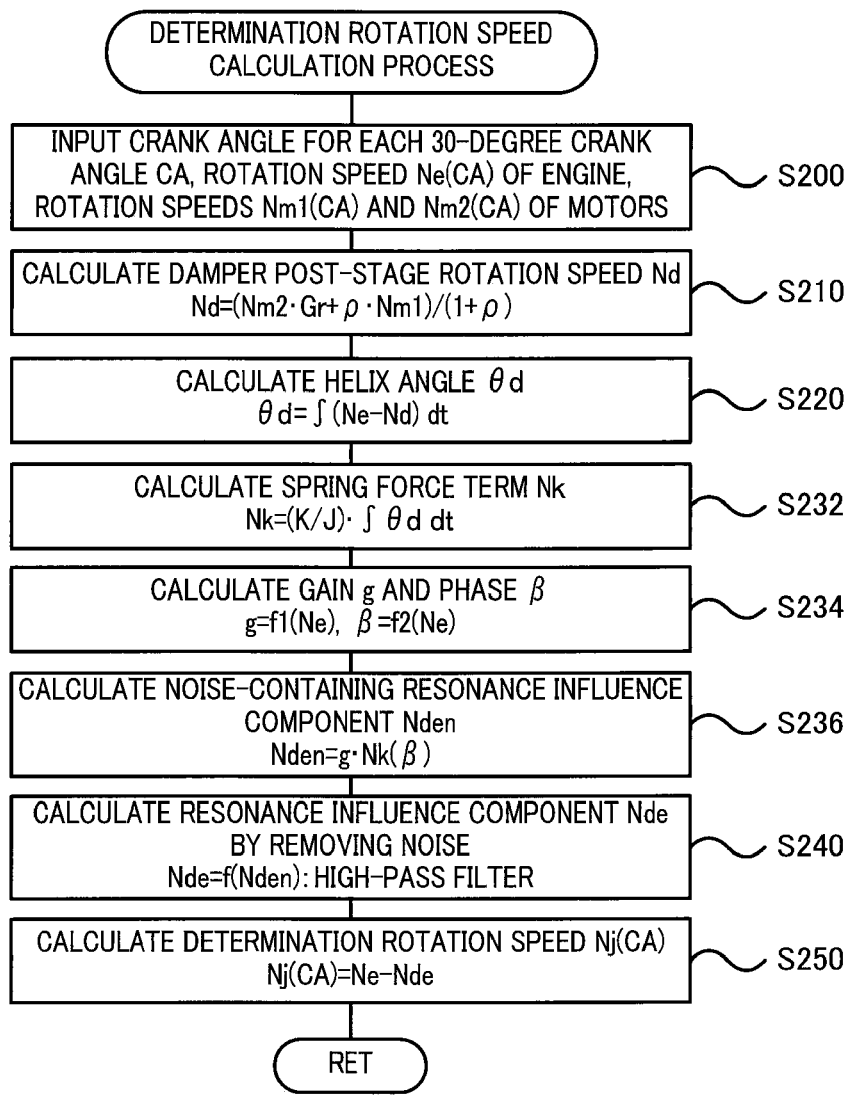
FIG. 7 is a flowchart showing a determination rotation speed calculation processing in one modified structure.

In the misfire determination device for an internal combustion engine included in the hybrid vehicle 20 in the embodiment, the calculation processing of the determination rotation speed Nj(CA) calculates the noise-containing resonance influence component Nden(CA) by the expression (3) using the helix angle θd (CA) of the damper 28 calculated using the rotation speed Ne(CA) of the engine 22 and the damper post-stage rotation speed Nd(CA), and the constant relation value (K/J) that is the ratio between the spring constant K of the damper 28 and the moment of inertia J of the side closer to the engine 22 than the damper 28. A component obtained by reflecting a gain g and a phase β as an influence of a damping force term of the damper 28 on a spring force term of the damper 28 calculated by the expression (3), however, may be calculated as the noise-containing resonance influence component Nden(CA). A flowchart of the determination rotation speed calculation processing in this case is shown in FIG. 7. In the determination rotation speed calculation processing, the helix angle θd(CA) of the damper 28 is calculated, then a spring force term of the damper 28 is calculated with the left side in the expression (3) as a spring force term Nk (Step S232), the gain g and the phase β as the influence of the damping force term of the damper 28 on the spring force term Nk is calculated on the basis of the rotation speed Ne(CA) of the engine 22 by the following expressions (10) and (11) (Step S234), and the calculated gain g and phase β are reflected on the spring force term Nk to calculate the noise-containing resonance influence component Nden(CA) (Step S236). Then, the high-pass filter is applied to the noise-containing resonance influence component Nden(CA) for removing the low frequency noise of the noise-containing resonance influence component Nden(CA) to calculate the resonance influence component Nde(CA) (Step S240), and the calculated resonance influence component Nde (CA) is subtracted from the rotation speed Ne(CA) of the engine 22 to calculate the determination rotation speed Nj(CA) (Step S250). Next, the gain g and the phase β as the influence of the damping force term of the damper 28 on the spring force term Nk will be described.

$$g = \sqrt{1 + (2\pi f)^2 \cdot \left(\frac{Cdamp}{Kdamp}\right)^2} \quad (10)$$

$$\beta = \tan^{-1}\frac{2(\pi f) \cdot Cdamp}{Kdamp} \quad (11)$$

An influence component ωe-damp of the damper 28 on the crankshaft 26 can be expressed by the expression (12) and modified by the expression (13), where ωe-damp is a rotation angle speed as the influence component of the damper 28 on the crankshaft 26, ωe is a rotation angle speed of the crankshaft 26, ωinp is a rotation angle speed of the post-stage shaft of the damper 28, θe is the rotation angle of the crankshaft 26, θinp is a rotation angle of the post-stage shaft of the damper 28, Kdamp is a spring constant of the damper 28, Cdamp is a constant in the damping force term of the damper 28, and Ie is the moment of inertia of the side closer to the engine 22 than the damper 28. The right side first term in the expression (12) is the spring force term, and the right side second term is the damping force term.

$$\omega e - damp = \frac{Kdamp}{Ie}\int(\theta inp - \theta e)dt + \frac{Cdamp}{Ie}\int(\omega inp - \omega e)dt \quad (12)$$

$$\omega e - damp = \frac{Kdamp}{Ie}\int\int(\omega inp - \omega e)dt^2 + \frac{Cdamp}{Ie}\int(\omega inp - \omega e)dt \quad (13)$$

When a helix angle speed of the damper 28 is expressed by the expression (14) where f is a frequency of a misfire of any cylinder of the engine 22 and α is an amplitude of the helix angle speed of the damper 28, the expression (13) can be modified to the expression (15). The spring force term in the right side first term in the second expression of the expression (15) can be compared with the third expression to obtain the expressions (10) and (11) described above.

$$(\omega inp - \omega e) = a \cdot \sin(2\pi f) \quad (14)$$

$$\omega e - damp = \quad (15)$$
$$\frac{Kdamp}{Ie}\int\int(\alpha \cdot \sin(2\pi f))dt^2 + \frac{Cdamp}{Ie}\int(\alpha \cdot \sin(2\pi f))dt =$$
$$\frac{Kdamp}{Ie} \cdot \frac{-\alpha \cdot \sin(2\pi f)}{(2\pi f)^2} + \frac{Cdamp}{Ie} \cdot \frac{-\alpha \cdot \cos(2\pi f)}{(2\pi f)} =$$
$$\frac{-\alpha}{Ie \cdot (2\pi f)^2}\sqrt{Kdamp^2 + (2\pi f)^2 \cdot Cdamp^2} \cdot \sin(2\pi f + \beta)$$
$$\text{where } \tan\beta = \frac{(2\pi f) \cdot Cdamp}{Kdamp}$$

In the embodiment, for simplicity of calculation, a constant Cdamp in the damping force term of the damper 28 previously calculated by experiment is used considering that the constant does not change with time, and a spring constant Kdmp obtained by multiplying the constant relation value (K/J) that is the learning value by the moment of inertia J previously calculated by experiment is used considering that the moment of inertia J of the side closer to the engine 22 than the damper 28 slightly changes with time. Since any cylinder of the engine 22 misfires once per two rotations of the crankshaft 26 in view of continuous misfires of the cylinder, the frequency f relative to the rotation speed Ne of the engine 22 can be calculated by f=Ne/120. Thus, the frequency f of the misfire calculated from the rotation speed Ne of the engine 22, the spring constant Kdamp obtained by multiplying the constant relation value (K/J) by the moment of inertia J previously calculated by experiment, and the constant Cdamp previously calculated by experiment can be used in the expressions (10) and (11) to calculate the gain g and the phase β as the influence of the damping force term of the damper 28 on the spring force term Nk. It is understood that the rotation speed Ne of the engine 22 and the damper post-stage rotation speed Nd can be multiplied by conversion coefficient of 2π/60 or the like and replaced by the rotation angle speed ωe of the crankshaft 26 and the rotation angle speed ωinp of the post-stage shaft of the damper 28.

Thus, the gain g and the phase β as the influence of the damping force term of the damper 28 on the spring force term Nk are calculated, and the calculated gain g and phase β are reflected on the spring force term Nk to calculate the noise-containing resonance influence component Nden(CA), thereby allowing more proper calculation of the noise-containing resonance influence component Nden(CA), and more proper calculation of the determination rotation speed Nj(CA). Thus, the misfire of the engine 22 can be determined with higher accuracy.

When the gain g and the phase β as the influence of the damping force term of the damper 28 on the spring force term Nk are used to calculate the determination rotation speed Nj(CA), it is allowed that changes with time of the constant Cdamp in the damping force term of the damper 28 is considered, and changes with time of the spring constant Kdmp is not considered. It is also allowed that the comb filter, instead of the high-pass filter, is applied to the noise-containing resonance influence component Nden(CA) for removing the low frequency noise of the noise-containing resonance influence component Nden(CA) to calculate the resonance influence component Nde(CA).

In the misfire determination device for an internal combustion engine included in the hybrid vehicle 20 in the embodiment, the crank angle CA for each crank angle of 30°, the rotation speed Ne(CA) of the engine 22, and the rotation speeds Nm1(CA) and Nm2(CA) of the motors MG1 and MG2 are inputted to calculate the damper post-stage rotation speed Nd(CA) and the resonance influence component Nde (CA), and calculate the determination rotation speed Nj(CA). However, the determination rotation speed Nj(CA) may be calculated at a crank angle of any degree, and thus the resonance influence component Nde(CA) and the determination rotation speed Nj(CA) may be calculated at each crank angle of 10° or 5°.

In the misfire determination device for an internal combustion engine included in the hybrid vehicle 20 in the embodiment, the 30-degree rotation times T30(CA) is calculated from the determination rotation speed Nj (CA), the time difference TD30 is calculated as the difference between the 30-degree rotation times T30(ATDC30) and T30(ATDC90) 30 degrees (ATDC30) and 90 degrees (ATDC90) after the top dead center of the compression stroke of the target cylinder, and further the determination value J30 as the 360° difference of the time difference TD30 is calculated to determine the misfire of the engine 22. However, the misfire of the engine 22 may be determined by any calculation method as long as it determines the misfire of the engine 22 using the determination rotation speed Nj(CA).

In the misfire determination device for an internal combustion engine included in the hybrid vehicle 20 in the embodiment, the misfire of any cylinder of the eight-cylinder engine 22 is determined. The engine, however, may include any number of cylinders as long as a misfire of any cylinder of a multicylinder engine is determined, and a misfire of any cylinder of a six- or four-cylinder engine may be determined.

In the misfire determination device for an internal combustion engine included in the hybrid vehicle 20 in the embodiment, the misfire of the engine 22 is determined in the configuration in which the motor MG2 is connected to the ring gear shaft 32a via the reduction gear 35. However, the misfire of the engine 22 may be determined in a configuration in which the motor MG2 is connected to the ring gear shaft 32a via a transmission instead of the reduction gear 35. The misfire of the engine 22 may be determined in a configuration in which the motor MG2 is directly connected to the ring gear shaft 32a without via the reduction gear 35 or the transmission.

Figure 8:
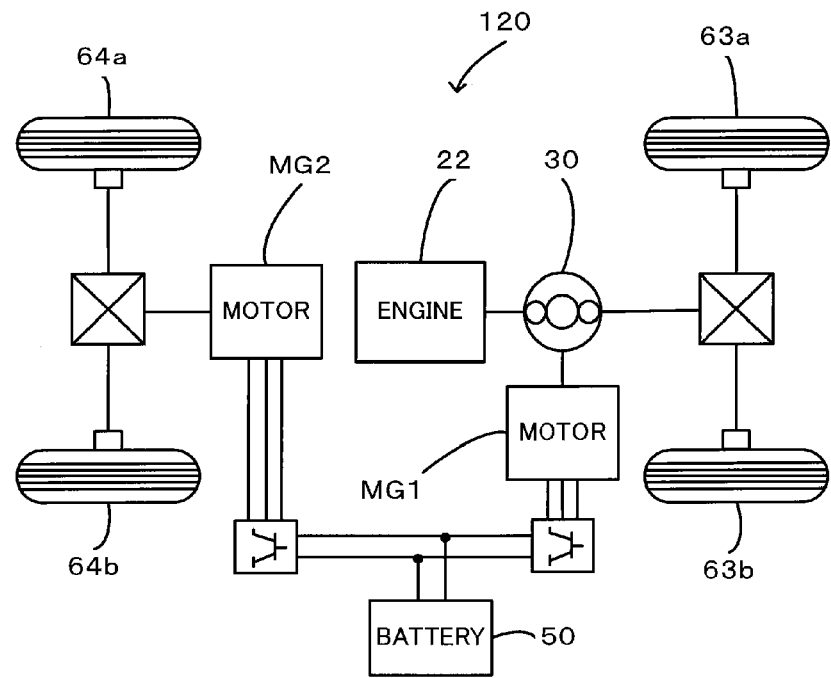
FIG. 8 is a schematic block diagram of a configuration of a hybrid vehicle 120 in one modified structure.
Figure 9:
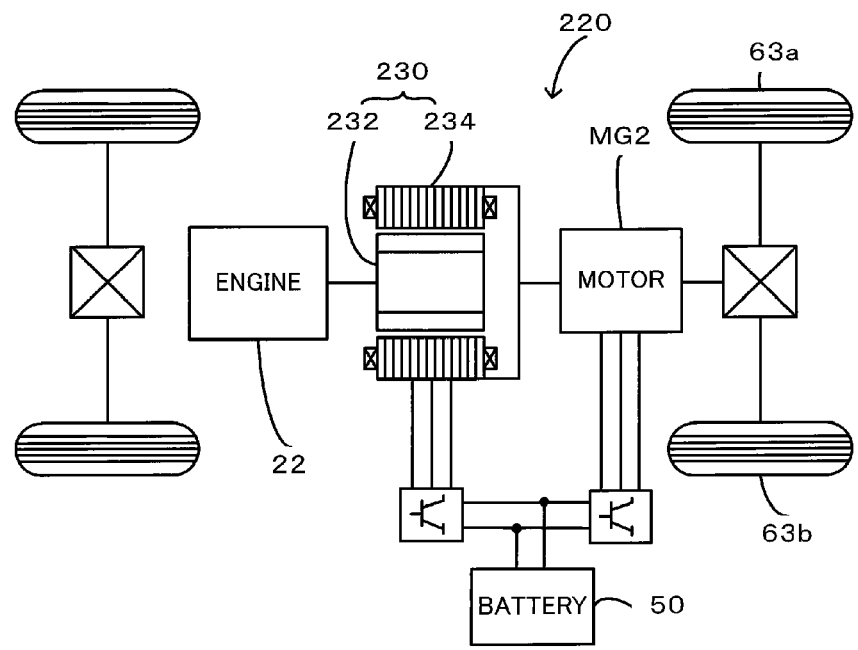
FIG. 9 is a schematic block diagram of a configuration of a hybrid vehicle 220 in another modified structure.

In the misfire determination device for an internal combustion engine included in the hybrid vehicle 20 in the embodiment, the misfire of the engine 22 is determined in the vehicle including the power distribution and integration mechanism 30 that is connected to the crankshaft 26 of the engine 22 via the damper 28 as the torsion element, and connected to the rotating shaft of the motor MG1 and the ring gear shaft 32a, and the motor MG2 connected to the ring gear shaft 32a via the reduction gear 35. However, it is only necessary that the crankshaft of the engine is connected in the post stage via the damper as the torsion element, and thus a misfire of the engine 22 may be determined in a vehicle, as illustrated by a hybrid vehicle 120 in a variant in FIG. 8, in which power of the motor MG2 is connected to an axle (axle to which wheels 64a and 64b are connected in FIG. 8) different from an axle to which the ring gear shaft 32a is connected (axle to which drive wheels 63a and 63b are connected), or in a vehicle, as illustrated by a hybrid vehicle 220 in a variant in FIG. 9, including a pair-rotor motor 230 that includes an inner rotor 232 connected to the crankshaft 26 of the engine 22 via the damper 28 and an outer rotor 234 connected to an axle that outputs power to the drive wheels 63a and 63b, and transmits part of the power of the engine 22 to the axle and converts the remaining power into electric power. In this case, the motor MG2 may be connected to the axle via the reduction gear 35 or the transmission, or without via the reduction gear 35 or the transmission.

Now, correspondence between essential elements in the embodiment and essential elements in the invention described in the disclosure of the invention will be described. In the embodiment, the crank position sensor 140 that detects the rotational position of the crankshaft 26, and the engine ECU 24 that calculates the rotation speed for each 30° rotation of the crankshaft 26 as the rotation speed Ne of the engine 22 on the basis of the shaped wave from the crank position sensor 140 correspond to an output shaft rotation speed detection module, the rotational position detection sensors 43 and 44 that detect the rotational positions of the rotors of the motors MG1 and MG2, the motor ECU 40 that calculates the rotation speeds Nm1 and Nm2 of the motors MG1 and MG2 on the basis of the signals from the rotational position detection sensors 43 and 44, and the engine ECU 24 that calculates the damper post-stage rotation speed Nd as the rotation speed of the carrier shaft 34a (corresponding to a post-stage shaft) in the post-stage of the damper 28 on the basis of the rotation speeds Nm1 and Nm2 of the motors MG1 and MG2 correspond to a post-stage shaft rotation speed detection module, the engine ECU 24 that performs the processings in S220 to S240 in FIG. 4 of calculating the helix angle θd of the damper 28 by the expression (2) using the rotation speed Ne of the engine 22 and the damper post-stage rotation speed Nd, calculating the noise-containing resonance influence component Nden(CA) containing the low frequency noise as the influence of the resonance of the damper 28 on the rotation speed of the engine 22 using the constant relation value (K/J) that is the ratio between the spring constant K of the damper 28 and the moment of inertia J of the side closer to the engine 22 than the damper 28, and the helix angle θd, and further removing the low frequency noise by the high-pass filter to calculate the resonance influence component Nde(CA) corresponds to a resonance influence component calculation module, and the engine ECU 24 that performs the processing in S250 in FIG. 4 of subtracting the resonance influence component Nde(CA) from the rotation speed Ne(CA) of the engine 22 to calculate the determination rotation speed Nj(CA) and the misfire determination processing in FIG. 3 of determining the misfire of the engine 22 using the determination rotation speed Nj(CA) correspond to a misfire determination module. The engine ECU 24 that performs the constant relation value learning processing in FIG. 5 of learning the constant relation value (K/J) in the one-cylinder lean operation state corresponds to a relation value learning module. Further, the motor MG2 that outputs to the carrier shaft 34a in the post-stage of the damper 28, that is, to the ring gear shaft 32a in a further post-stage via the reduction gear 35 corresponds to an electric motor, the power distribution and integration mechanism 30 connected to the carrier shaft 34a in the post-stage of the damper 28 and the ring gear shaft 32a on the side of the axle, and the motor MG1 connected to the sun gear 31 of the power distribution and integration mechanism 30 correspond to an electric power-mechanical power input output mechanism. The correspondence between the essential elements in the embodiment and the essential elements described in the disclosure of the invention does not limit the elements of the invention described in the disclosure of the invention since the embodiment is an example for describing in detail the best mode for carrying out the invention described in the disclosure of the invention. Specifically, the invention described in the disclosure of the invention should be construed on the basis of the description therein, and the embodiment is merely a detailed example of the invention described in the disclosure of the invention.

The above embodiment regards the misfire determination device for the internal combustion engine mounted on the hybrid vehicle 20. The technique of the invention is not restricted to this embodiment but may be applicable to a misfire determination device for an internal combustion engine mounted on a vehicle without a drive motor and a generator. The technique of the invention is further applicable to a misfire determination device for an internal combustion engine mounted on any of various vehicles other than motor vehicles, boats and ships, and aircraft, or an internal combustion engine incorporated in any of stationary equipment. The technique of the invention is not restricted to the misfire determination device or the vehicle with the misfire determination device, but may also be actualized as a misfire determination method for an internal combustion engine.

The embodiment and its modified examples discussed above are to be considered in all aspects as illustrative and not restrictive. There may be many other modifications, changes, and alterations without departing from the scope or spirit of the main characteristics of the present invention.

INDUSTRIAL APPLICABILITY

The technique of the present invention is preferably applied to the manufacturing industries of misfire determination devices and vehicles with the misfire determination device.

The invention claimed is:

1. A misfire determination device for an internal combustion engine that determines a misfire of a multicylinder internal combustion engine in which an output shaft is connected to a post-stage shaft in a post-stage via a torsion element, said misfire determination device comprising:
 an output shaft rotation speed detection module that detects an output shaft rotation speed that is a rotation speed of said output shaft;
 a post-stage shaft rotation speed detection module that detects a post-stage shaft rotation speed that is a rotation speed of said post-stage shaft;
 a resonance influence component calculation module that calculates a resonance influence component as an influence of resonance caused by torsion of said torsion element on the rotation speed of said output shaft on the basis of said detected output shaft rotation speed and said detected post-stage shaft rotation speed; and
 a misfire determination module that determines a misfire of said internal combustion engine on the basis of a detection rotation speed obtained by subtracting said calculated resonance influence component from said detected output shaft rotation speed.

2. The misfire determination device for an internal combustion engine according to claim 1, wherein said resonance influence component calculation module calculates a helix angle of said torsion element from said detected output shaft rotation speed and said detected post-stage shaft rotation speed, and calculates said resonance influence component on the basis of said calculated helix angle, a spring constant of said torsion element, and a moment of inertia of the side closer to said internal combustion engine than said torsion element.

3. The misfire determination device for an internal combustion engine according to claim 2, wherein said resonance influence component calculation module calculates said helix angle on the basis of integral calculation of a value obtained by subtracting said detected post-stage shaft rotation speed from said detected output shaft rotation speed, and calculates said resonance influence component on the basis of integral calculation of a constant relation value between said spring constant and said moment of inertia multiplied by said helix angle.

4. The misfire determination device for an internal combustion engine according to claim 3, wherein said misfire determination device further comprises a relation value learning module that learns said constant relation value, and
 said resonance influence component calculation module calculates said resonance influence component using said constant relation value learned by said relation value learning module.

5. The misfire determination device for an internal combustion engine according to claim 4, wherein said relation value learning module learns said constant relation value on the basis of a rotation angle acceleration of said output shaft calculated on the basis of said detected output shaft rotation speed and said helix angle calculated from said detected output shaft rotation speed and said detected post-stage shaft rotation speed.

6. The misfire determination device for an internal combustion engine according to claim 5, wherein said constant relation value is a value obtained by dividing said spring constant by said moment of inertia, and
 said relation value learning module learns said constant relation value as a value obtained by dividing the rotation angle acceleration of said output shaft by said helix angle.

7. The misfire determination device for an internal combustion engine according to claim 4, wherein said relation value learning module learns said constant relation value in a one-cylinder lean operation state that is an operation state of said internal combustion engine in which a fuel injection amount of any one of cylinders of said internal combustion engine is reduced to increase an air/fuel ratio of said cylinder higher than an air/fuel ratio of other cylinders.

8. The misfire determination device for an internal combustion engine according to claim 3, wherein said resonance influence component calculation module reflects a gain and a phase corresponding to said detected output shaft rotation speed on a spring force component obtained by integral calculation of said constant relation value multiplied by said helix angle, to calculate said resonance influence component.

9. The misfire determination device for an internal combustion engine according to claim 8, wherein said gain is a value calculated by $\{1+(2\pi f)^2 \cdot (C/K)^2\}^{1/2}$, where f is a frequency of a misfire when one cylinder of said internal combustion engine misfires, C is a constant in an damping term of said torsion element, and K is a spring constant of said torsion element,
 and said phase is a value calculated by $\tan-1(2\pi fC/K)$.

10. The misfire determination device for an internal combustion engine according to claim 9, wherein the frequency of said misfire is a specific frequency at a rate of one to two rotations of said output shaft.

11. The misfire determination device for an internal combustion engine according to claim 9, wherein said spring constant is a value obtained by multiplying said constant relation value by an initial value of a moment of inertia of the side closer to said internal combustion engine than said torsion element.

12. The misfire determination device for an internal combustion engine according to claim 1, wherein said resonance influence component calculation module calculates said resonance influence component by performing a filtering processing of a component calculated on the basis of said detected output shaft rotation speed and said detected post-stage shaft rotation speed, without damping of the frequency of resonance and with the damping of a band of frequencies other than said frequency of resonance.

13. The misfire determination device for an internal combustion engine according to claim 12, wherein said filtering processing is a processing using a high-pass filter.

14. The misfire determination device for an internal combustion engine according to claim 12, wherein said filtering processing is a processing using a comb-like filter leaving multiple order frequency components of said frequency of resonance with a gain=1 and a phase=0.

15. A vehicle comprising:
 a multicylinder internal combustion engine in which an output shaft is connected to a post-stage shaft in a post-stage via a torsion element;

an output shaft rotation speed detection module that detects an output shaft rotation speed that is a rotation speed of said output shaft;

a post-stage shaft rotation speed detection module that detects a post-stage shaft rotation speed that is a rotation speed of said post-stage shaft;

a resonance influence component calculation module that calculates a resonance influence component as an influence of resonance caused by torsion of said torsion element on the rotation speed of said output shaft on the basis of said detected output shaft rotation speed and said detected post-stage shaft rotation speed; and a misfire determination module that determines a misfire of said internal combustion engine on the basis of a detection rotation speed obtained by subtracting said calculated resonance influence component from said detected output shaft rotation speed.

16. The vehicle according to claim 15, wherein said vehicle further comprises an electric motor that can output power to said post-stage shaft in the post-stage of said torsion element, and said post-stage shaft rotation speed detection module also serves as a module that detects an electric motor rotation speed that is a rotation speed of said electric motor, and detects said post-stage shaft rotation speed by converting said detected electric motor rotation speed.

17. The vehicle according to claim 15, said vehicle further comprises an electric power-mechanical power input output mechanism that is connected to said post-stage shaft and an axle and inputs and outputs power to said post-stage shaft and said axle with input and output of the power, said electric motor is connected to said axle so as to be able to output the power, and said post-stage shaft rotation speed detection module also serves as a module that detects a driving state of said electric power-mechanical power input output mechanism, and detects said post-stage shaft rotation speed by calculation based on said detected electric motor rotation speed and said detected driving state.

18. The vehicle according to claim 17, wherein said resonance influence component calculation module calculates a helix angle of said torsion element from said detected output shaft rotation speed and said detected post-stage shaft rotation speed, and calculates said resonance influence component on the basis of said calculated helix angle, a spring constant of said torsion element, and a moment of inertia of the side closer to said internal combustion engine than said torsion element.

19. The vehicle according to claim 18, wherein said resonance influence component calculation module calculates said helix angle on the basis of integral calculation of a value obtained by subtracting said detected post-stage shaft rotation speed from said detected output shaft rotation speed, and calculates said resonance influence component on the basis of integral calculation of a constant relation value between said spring constant and said moment of inertia multiplied by said helix angle.

20. The vehicle according to claim 19, wherein said vehicle further comprises a relation value learning module that learns said constant relation value, and said resonance influence component calculation module calculates said resonance influence component using said constant relation value learned by said relation value learning module.

21. The vehicle according to claim 19, wherein said resonance influence component calculation module reflects a gain and a phase corresponding to said detected output shaft rotation speed on a spring force component obtained by integral calculation of said constant relation value multiplied by said helix angle, to calculate said resonance influence component.

22. The vehicle according to claim 21, wherein said gain is a value calculated by $\{1+(2\pi f)^2 \cdot (C/K)^2\}^{1/2}$, where f is a frequency of a misfire when one cylinder of said internal combustion engine misfires, C is a constant in an damping term of said torsion element, and K is a spring constant of said torsion element, and said phase is a value calculated by $\tan-1(2\pi fC/K)$.

23. The vehicle according to claim 17, wherein said resonance influence component calculation module calculates said resonance influence component by performing a filtering processing of a component calculated on the basis of said detected output shaft rotation speed and said detected post-stage shaft rotation speed, without damping of the frequency of resonance and with the damping of a band of frequencies other than said frequency of resonance.

24. The vehicle according to claim 23, wherein said filtering processing is a processing using a high-pass filter.

25. The vehicle according to claim 23, wherein said filtering processing is a processing using a comb-like filter leaving multiple order frequency components of said frequency of resonance with a gain=1 and a phase=0.

26. A misfire determination method for an internal combustion engine that determines a misfire of a multicylinder internal combustion engine in which an output shaft is connected to a post-stage shaft in a post-stage via a torsion element, said misfire determination method comprising:

calculating a resonance influence component as an influence of resonance caused by torsion of said torsion element on a rotation speed of said output shaft on the basis of an output shaft rotation speed a rotation speed of said output shaft and a post-stage shaft rotation speed as a rotation speed of said post-stage shaft; and determining a misfire of said internal combustion engine on the basis of a detection rotation speed obtained by subtracting said calculated resonance influence component from said detected output shaft rotation speed.

27. The misfire determination method for an internal combustion engine according to claim 26, wherein said method calculates a helix angle on the basis of integral calculation of a value obtained by subtracting said post-stage shaft rotation speed from said output shaft rotation speed, and calculates said resonance influence component on the basis of integral calculation of a constant relation value between said spring constant and said moment of inertia multiplied by said helix angle.

28. The misfire determination method for an internal combustion engine according to claim 27, wherein said method comprises learning a constant relation value in a one-cylinder lean operation state that is an operation state of said internal combustion engine in which a fuel injection amount of any one of cylinders of said internal combustion engine is reduced to increase an air/fuel ratio of said cylinder higher than an air/fuel ratio of other cylinders, the constant relation value being obtained by dividing the rotation angle acceleration of said output shaft calculated on the basis of said output shaft rotation speed by said helix angle calculated from said output shaft rotation speed and said post-stage shaft rotation speed, and calculating said resonance influence component using said learned constant relation value.

29. The misfire determination method for an internal combustion engine according to claim 27, wherein said method reflects a gain and a phase corresponding to said output shaft rotation speed on a spring force component obtained by integral calculation of said constant relation value multiplied by said helix angle, to calculate said resonance influence component.

30. The misfire determination method for an internal combustion engine according to claim 26, wherein said method calculates said resonance influence component by performing a filtering processing of a component calculated on the basis of said output shaft rotation speed and said post-stage shaft rotation speed, using a high-pass filter without damping of the frequency of resonance.

31. The misfire determination method for an internal combustion engine according to claim 26, wherein said method calculates said resonance influence component by performing a filtering processing of a component calculated on the basis of said output shaft rotation speed and said post-stage shaft rotation speed, using a comb-like filter leaving multiple order frequency components of said frequency of resonance with a gain=1 and a phase=0.

* * * * *

UNITED STATES PATENT AND TRADEMARK OFFICE
CERTIFICATE OF CORRECTION

| | |
|---|---|
| PATENT NO. | : 8,001,832 B2 |
| APPLICATION NO. | : 12/373994 |
| DATED | : August 23, 2011 |
| INVENTOR(S) | : Takashi Suzuki |

Page 1 of 1

It is certified that error appears in the above-identified patent and that said Letters Patent is hereby corrected as shown below:

Column    Line

17    38-39    Change Expression (13) to read as follows:

$$-- \omega e\text{-}damp = \frac{Kdamp}{Ie} \iint (\omega inp - \omega e)dt^2 + \frac{Cdamp}{Ie} \int (\omega inp - \omega e)dt \quad (13) \quad --.$$

Signed and Sealed this
Sixth Day of March, 2012

David J. Kappos
*Director of the United States Patent and Trademark Office*